(12) United States Patent
Hayashi et al.

(10) Patent No.: US 7,474,845 B2
(45) Date of Patent: Jan. 6, 2009

(54) LENS BARREL WITH A RELEASABLE ENGAGEMENT

(75) Inventors: Naohiko Hayashi, Matsubara (JP); Norio Maeda, Toyokawa (JP)

(73) Assignee: Konica Minolta Photo Imaging, Inc., Tokyo (JP)

(*) Notice: Subject to any disclaimer, the term of this patent is extended or adjusted under 35 U.S.C. 154(b) by 300 days.

(21) Appl. No.: 11/243,330

(22) Filed: Oct. 4, 2005

(65) Prior Publication Data

US 2006/0269267 A1 Nov. 30, 2006

(30) Foreign Application Priority Data

May 30, 2005 (JP) .............................. 2005-156857

(51) Int. Cl.
*G03B 17/00* (2006.01)
(52) U.S. Cl. ............................ 396/85; 396/83; 359/696; 359/827
(58) Field of Classification Search ................... 396/85, 396/79, 448, 144, 83, 146, 344, 503; 353/100, 353/101, 102, 119; 359/823, 827; 600/167; 248/222.11; 348/373–374
See application file for complete search history.

(56) References Cited

U.S. PATENT DOCUMENTS 5,983,032 A * 11/1999 Miyamoto .................... 396/83
6,654,557 B2 * 11/2003 Kikuchi et al. .............. 396/144
6,743,168 B2 * 6/2004 Luloh et al. ................. 600/167
2006/0002696 A1 * 1/2006 Onishi et al. ................. 396/85

FOREIGN PATENT DOCUMENTS

| JP | 06-214282 | | 8/1994 | |
| JP | 08184742 A | * | 7/1996 | |
| JP | 08-211272 | | 8/1996 | |
| JP | 08-110456 A | * | 12/1997 | ............... 359/696 |
| JP | 2002-206615 | | 7/2002 | |

OTHER PUBLICATIONS

Machine Translation of JP08-184742.*
Notification for Reasons for Refusal in Japanese Application No. 2005-156857, dated Jul. 31, 2007, with English translation, 9 pages.

* cited by examiner

*Primary Examiner*—W. B. Perkey
*Assistant Examiner*—Linda B Smith
(74) *Attorney, Agent, or Firm*—Brinks Hofer Gilson & Lione (57) ABSTRACT

The lens barrel of the present invention, in order to provide a lens barrel capable of reliably and easily preventing the breakage of the tooth of the revolving shaft of the driving motor and the tooth of the rack which teeth are engaged with each other, the lens barrel is provided with: the driving motor; the lens unit holder that has the rack receiving the transmission of the driving force by engaging with the revolving shaft which is a part of the driving motor, and holds the lens unit holder; and the spear portion that releases the engagement between the part of the revolving shaft and the rack.

18 Claims, 9 Drawing Sheets

PRIOR ART

Fig. 8

PRIOR ART

Fig. 9

PRIOR ART

LENS BARREL WITH A RELEASABLE ENGAGEMENT

This application is based on Japanese Patent Application No. 2005-156857 filed in Japan on May 30, 2005, the entire content of which is hereby incorporated by reference.

FIELD OF THE INVENTION

The present invention relates to a lens barrel that is mountable on the body of an image capturing apparatus such as a film-based camera or a digital still camera.

DESCRIPTION OF THE RELATED ART

In recent years, digital input apparatuses (digital still cameras, digital video cameras, etc.) capable of easily capturing image information into a personal computer (PC) or the like have been spreading among private users. Such digital still cameras (digital cameras) are required to be compact like cameras using silver halide film (film-based cameras). For this reason, various slim digital cameras provided with a lens barrel where the image capturing lens (lens unit) is collapsible have been developed.

Figure 7:
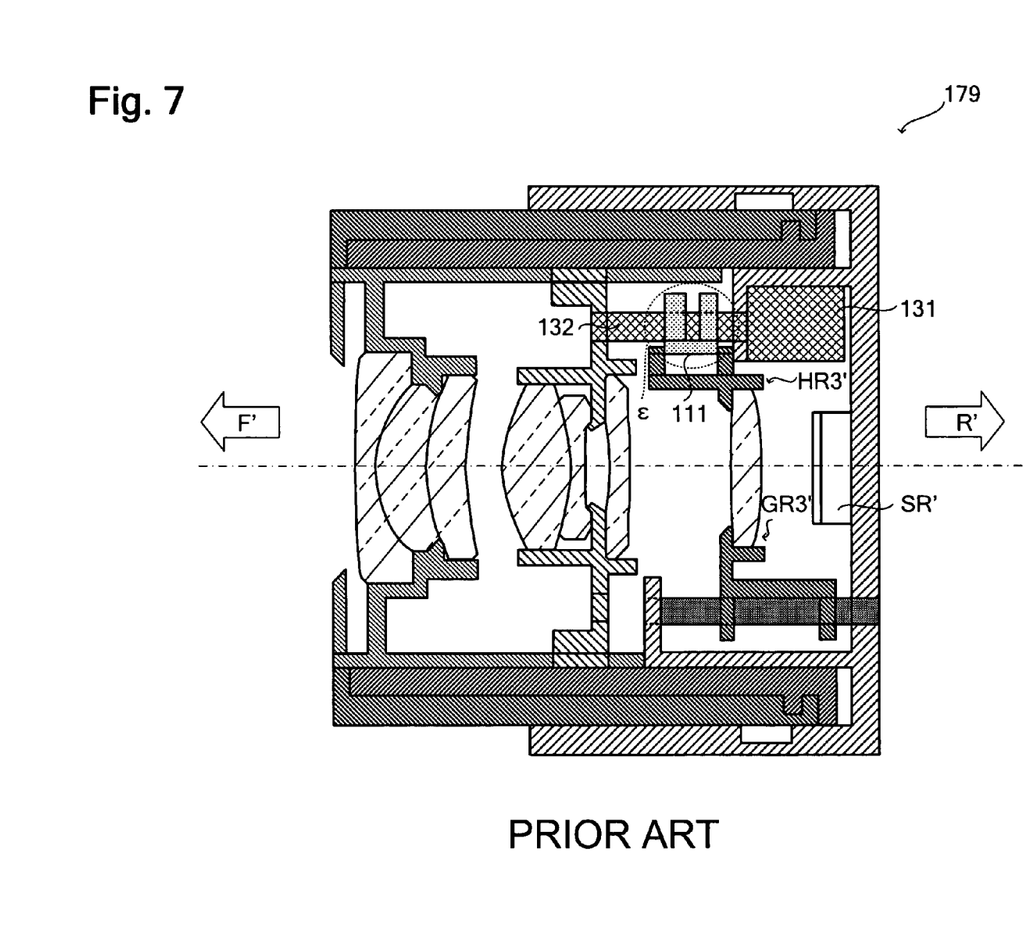
FIG. 7 is a schematic cross-sectional view showing the internal structure of the conventional lens barrel.
Figure 8:
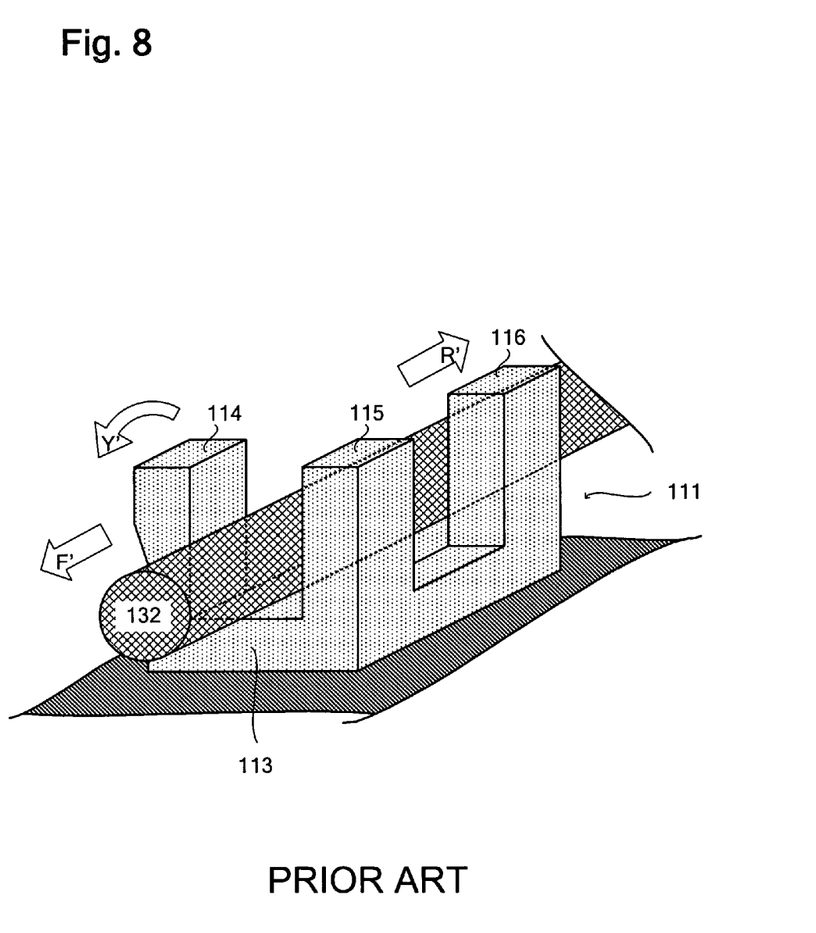
FIG. 8 is a schematic perspective view of the vicinity of the part ε of FIG. 7.
Figure 9:
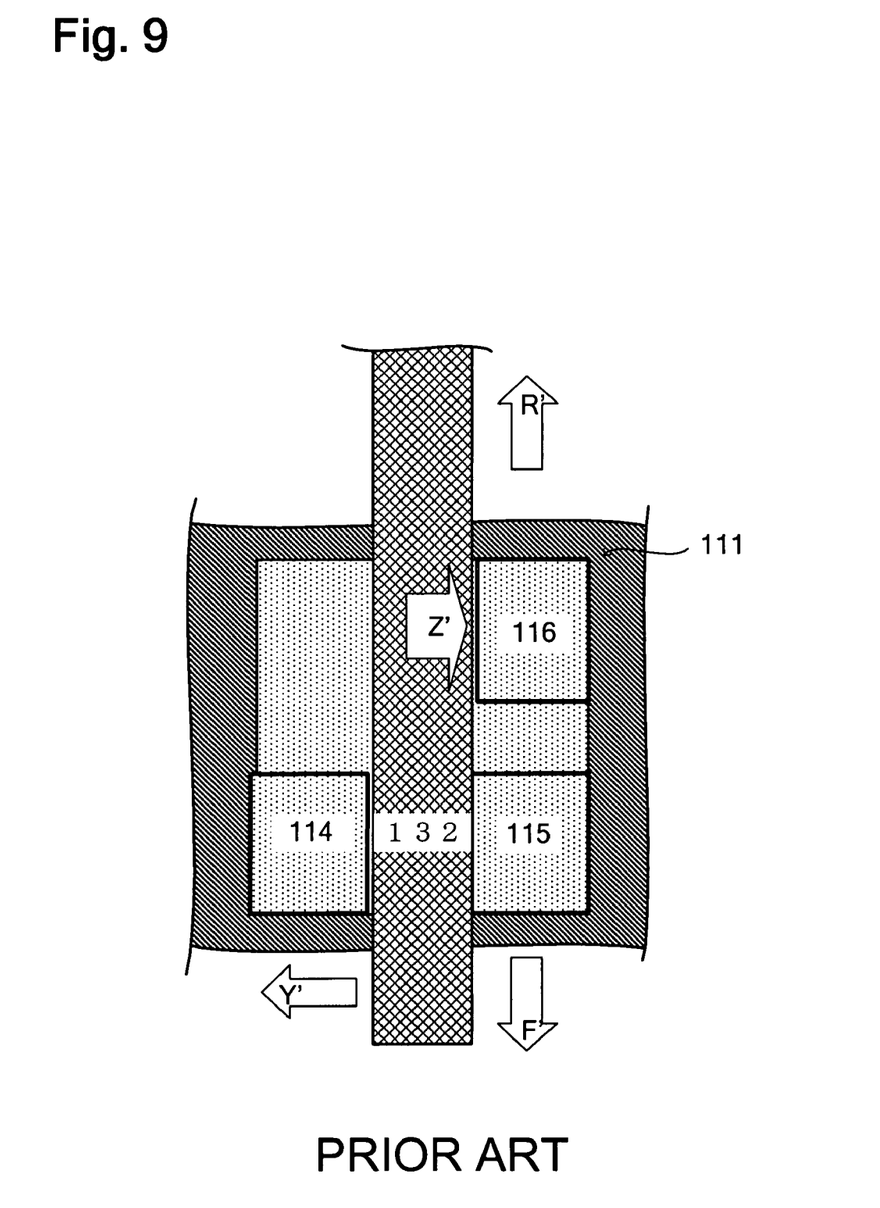
FIG. 9 is a plan view of FIG. 8 viewed from above.

In such a lens barrel for digital cameras and the like for example, a lens frame having a lens unit is moved by use of a driving force by a driving motor. FIGS. 7 to 9 show an example of such a lens barrel 179. FIG. 7 is a schematic cross-sectional view showing the internal structure of the lens barrel 179. FIG. 8 is a schematic perspective view of the vicinity of a part ε of FIG. 7. FIG. 9 is a plan view of FIG. 8 viewed from above.

As shown in FIG. 7, a lens frame HR3' having a lens unit GR3' closest to an image sensor SR' is moved by the motive force due to the rotation of a revolving shaft 132 of a driving motor 131. For this reason, a rack 111 that transmits a driving force by engaging with a helical lead screw or the like (not shown) provided on the periphery of the revolving shaft 132 is provided on the lens frame HR3'.

The rack 111 has a first sandwiching piece 114 and a second sandwiching piece 115 that rise from a rack body 113 in order to sandwich the revolving shaft 132 (see FIG. 8). A tooth portion (not shown) that engages with a tooth portion of the lead screw is provided on a wall surface (inner wall surface) of the second sandwiching piece 115 or the like that is in contact with the revolving shaft 132. For this reason, the driving force due to the rotation of the revolving shaft 132 is transmitted to the lens frame HR3' through the rack 111. The lens frame HR3' is movable backward and forward.

It is preferable that the second sandwiching piece 115 be high in rigidity since the tooth portion is carved thereon. However, the first sandwiching piece 114 has elasticity in order to ensure more reliable sandwiching of the revolving shaft 132 by the sandwiching pieces 114 and 115. That is, even when there is a clearance between the rack 111 and the revolving shaft 132, the rack 111 having the first sandwiching piece 114 having elasticity can reliably sandwich the revolving shaft 132 with the sandwiching pieces 114 and 115.

However, there are cases where the first sandwiching piece 114 having elasticity excessively bends in a direction that releases the sandwiching, for example, when a shock is given to the lens barrel 179. That is, as shown in FIGS. 8 and 9, there are cases where the first sandwiching piece 114 bends in a direction away from the second sandwiching piece 114 (Y' direction) because of the contact between the revolving shaft 132 and the first sandwiching piece 114 due to a shock.

When such a bend of the first sandwiching piece 114 is caused, the force to sandwich the revolving shaft 132 by the sandwiching pieces 114 and 115 decreases. Then, there is a possibility that a relative movement occurs between the rack 111 and the revolving shaft 132 in the direction of the revolving shaft (that is, a forward direction F' and a backward direction R' of the lens frame HR3'). When such a movement occurs, the tooth portion of the revolving shaft 132 and the tooth portion of the rack 111 break.

Therefore, to prevent such a situation, the rack 111 is provided with a wall portion 116 that is contactable with the base direction side of the revolving shaft 132. Although not in contact with the revolving shaft 132 normally, the wall portion 116 is in contact with the revolving shaft 132 when the revolving shaft 132 and the first sandwiching piece 114 are brought into excessive contact with each other due to a shock or the like. That is, as shown in FIG. 9, the wall portion 116 suppresses the fluctuation (movement) of the revolving shaft 132 on the base side in the Z' direction (the direction in which the revolving shaft on the base side is brought into intimate contact with the wall portion 116).

When the fluctuation of the revolving shaft 132 on the base side is suppressed by such a wall portion 116, the excessive contact between the first sandwiching piece 114 and the revolving shaft 132 is suppressed while the engagement (for example, mesh) between the tooth portion of the revolving shaft 132 and the tooth portion of the second sandwiching piece 115 is ensured consequently, the breakage of the tooth portion of the revolving shaft 132 and the tooth portion of the rack 111 can be prevented.

However, the wall portion 116 of the rack 111 is comparatively compact. For this reason, it cannot be said that the fluctuation of the revolving shaft 132 on the base side is completely suppressed. Moreover, normally, the wall portion 116 is not in contact with the revolving shaft 132. For this reason, extremely difficult design, manufacture and the like are required of the size, the position of disposition and the like of the wall portion 116.

SUMMARY OF THE INVENTION

The present invention is made to solve the above-mentioned problems, and an object thereof is to provide a lens barrel in which when the lens frame is moved, the engagement relationship between the revolving shaft and the rack is established and when the lens frame is not moved, the breakage of the tooth portion of the revolving shaft, the tooth portion of the rack and the like can be reliably and easily prevented.

The above-mentioned object is attained by providing the following structure:

A lens barrel that is extensible and collapsible in the direction of the optical system of the present invention has: an optical system comprising a plurality of lens units; a first driving source for supplying a motive force; a transmission portion that engages with a part of the first driving source to thereby receive the transmission of the motive force; and a first lens unit holding frame for holding at least one of the lens units, and the engagement between the transmission portion and the part of the first driving source is released by a displacement of the transmission portion.

According to this structure, in the lens barrel of the present invention, the breakage of the transmission portion or the driving source provided to move the lens units included in the optical system can be reliably and easily prevented.

BRIEF DESCRIPTON OF THE DRAWINGS

These and other objects and features of the present invention will become clear from the following description taken in conjunction with the preferred embodiments thereof with reference to the accompanying drawings, in which.

DESCRIPTION OF THE PREFERRED EMBODIMENTS

Hereinafter, embodiments of the present invention will be described with reference to the drawings.

First Embodiment

Figure 1:
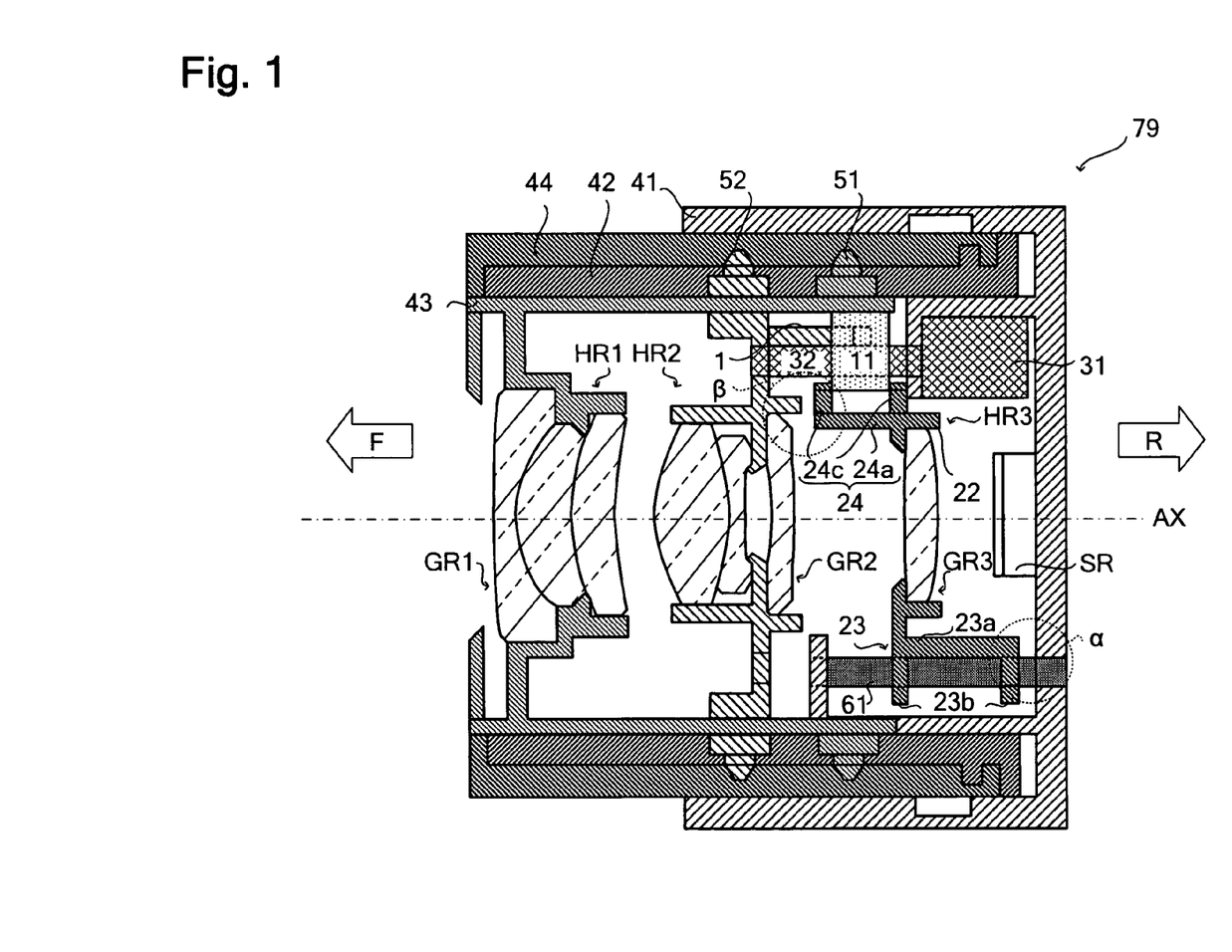
FIG. 1 is a schematic cross-sectional view showing the internal structure of a lens barrel of the present invention in a collapsed condition.
Figure 2:
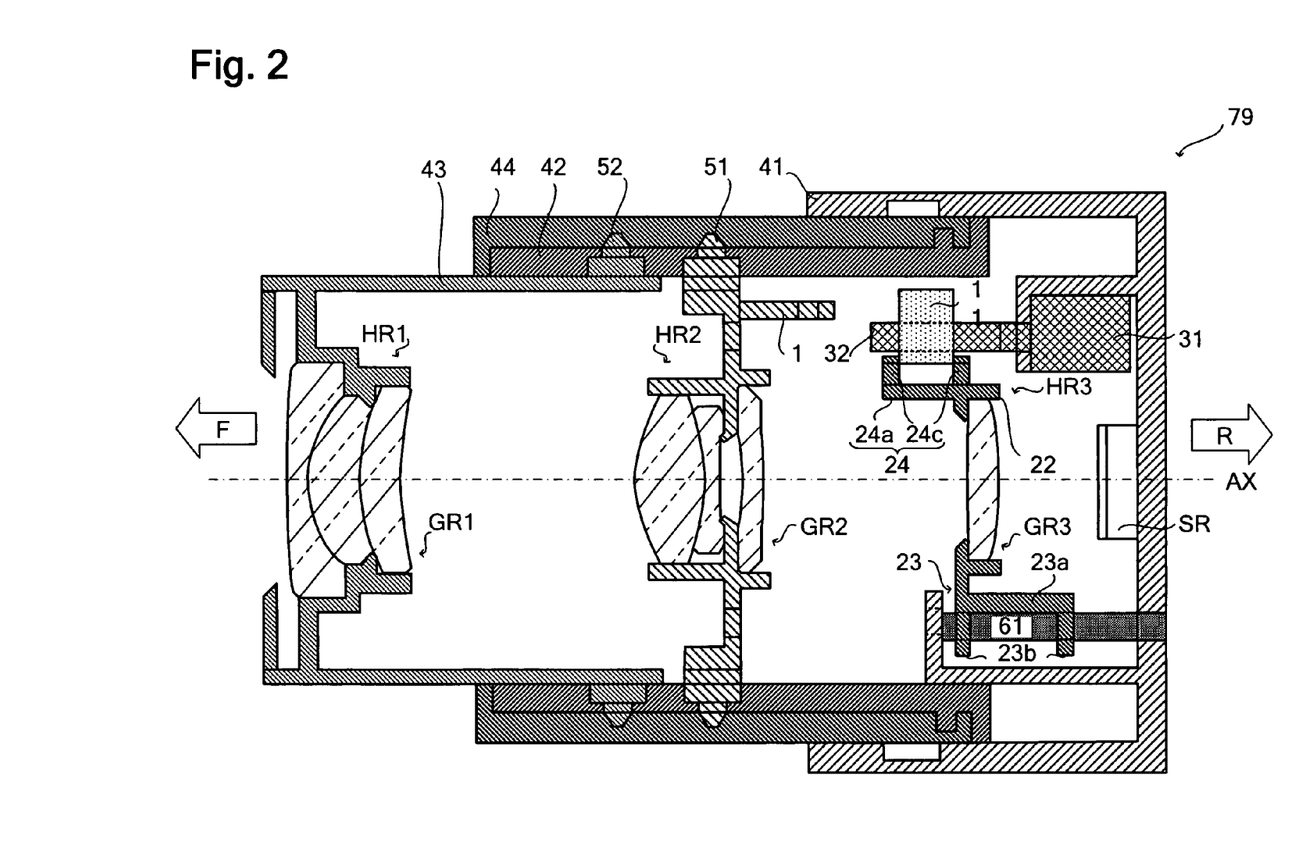
FIG. 2 is a schematic cross-sectional view showing the internal structure of the lens barrel of the present invention in an extended condition (photographing possible condition)

An embodiment of the present invention will be described based on the drawings as follows:

FIG. 1 is a schematic cross-sectional view showing the internal structure of a lens barrel 79 of the present invention in a collapsed condition. FIG. 2 is a schematic cross-sectional view showing the internal structure of the lens barrel 79 of the present invention in an extended condition (photographing possible condition).

The lens barrel 79 is mounted on a non-illustrated digital camera or the like, and includes a stationary barrel 41, a rectilinearly movable barrel 42, a movable barrel 43 and a cam ring 44.

The stationary barrel 41 is attached to the camera body, and the rectilinearly movable barrel 42 is housed in the stationary barrel 41. Moreover, the movable barrel 43 is housed in the rectilinearly movable barrel 42. Further, the cam ring 44 is housed between the stationary barrel 41 and the rectilinearly movable barrel 42.

In such a lens barrel 79, a lens system (image capturing lens system) comprising a first lens unit GR1, a second lens unit GR2 and a third lens unit GR3 arranged from the object side toward the image side (the side of an image sensor SR) is housed. Specifically, the first lens unit GR1 is held by a first lens unit holder HR1 provided in the movable barrel 43. On the other hand, the second lens unit GR2 and the third lens unit GR3 are held by a second lens unit holder HR2 and a third lens unit holder HR3.

The movable barrel 43 (specifically, the first lens unit holder HR1) and the second lens unit holder HR (the second lens unit holding frame) 2 are provided with a first pin 51 and a second pin 52. The first pin 51 and the second pin 52 are fitted in non-illustrated through holes provided in the barrel axis direction (axial direction) of the rectilinearly movable barrel 42, and are engaged with a non-illustrated first cam groove and second cam groove provided on the inner surface of the cam ring 44 (cam engagement).

For this reason, when the cam ring 44 is rotated, as shown in FIG. 2, the movable barrel 43 and the second lens unit holder HR2 (and the first lens unit GR1 and the second lens unit GR2) move backward and forward in the direction of the optical axis AX. Expressing differently, it can be said that the cam ring 44 rendered movable backward and forward while rotating by a long gear (not shown) and a helicoid (not shown) that is formed on the inner surface of the stationary barrel 41 moves in concert with the bayonet-connected rectilinearly movable barrel 42 to thereby render the first lens unit GR1 and the second lens unit GR2 movable backward and forward in the direction of the optical axis AX.

The cam ring 44 may be rotated by a dedicated driving motor (second driving source, not shown) or rotated manually. Moreover, such a mechanism to move the lens barrel 79 by the cam ring 44 or the like will be referred to as extension and collapse movement mechanism. Moreover, the direction in which the lens units are moved out toward the object side in the direction of the optical axis will be referred to as forward direction F, and the direction opposite to the forward direction F (direction in which the lens units return to the image side (image sensor SR)) will be referred to as backward direction R.

The third lens unit holder (first lens unit holding frame) HR3 is attached to a guide shaft 61 provided on the stationary barrel 41. The guide shaft 61 is provided so as to protrude from the rear end side (for example, the surface where the image sensor SR is disposed) of the stationary barrel 41 in the forward direction F. A guide hole 21 (see FIGS. 3 and 4 described later) in which the guide shaft 61 is fitted is provided at one end of the third lens unit holder HR3. For this reason, by these (the guide shaft 61 and the guide hole 21) being fitted together, the third lens unit holder HR3 is slidably held.

Moreover, a rack (transmission portion) 11 is attached to the other end of the third lens unit holder HR3. A driving motor 31 provided in the stationary barrel 41 transmits a motive force (driving force) through the rack 11 to thereby move the third lens unit holder HR3 backward or frontward.

2. Details of the Third Lens Unit Holder

Figure 3:
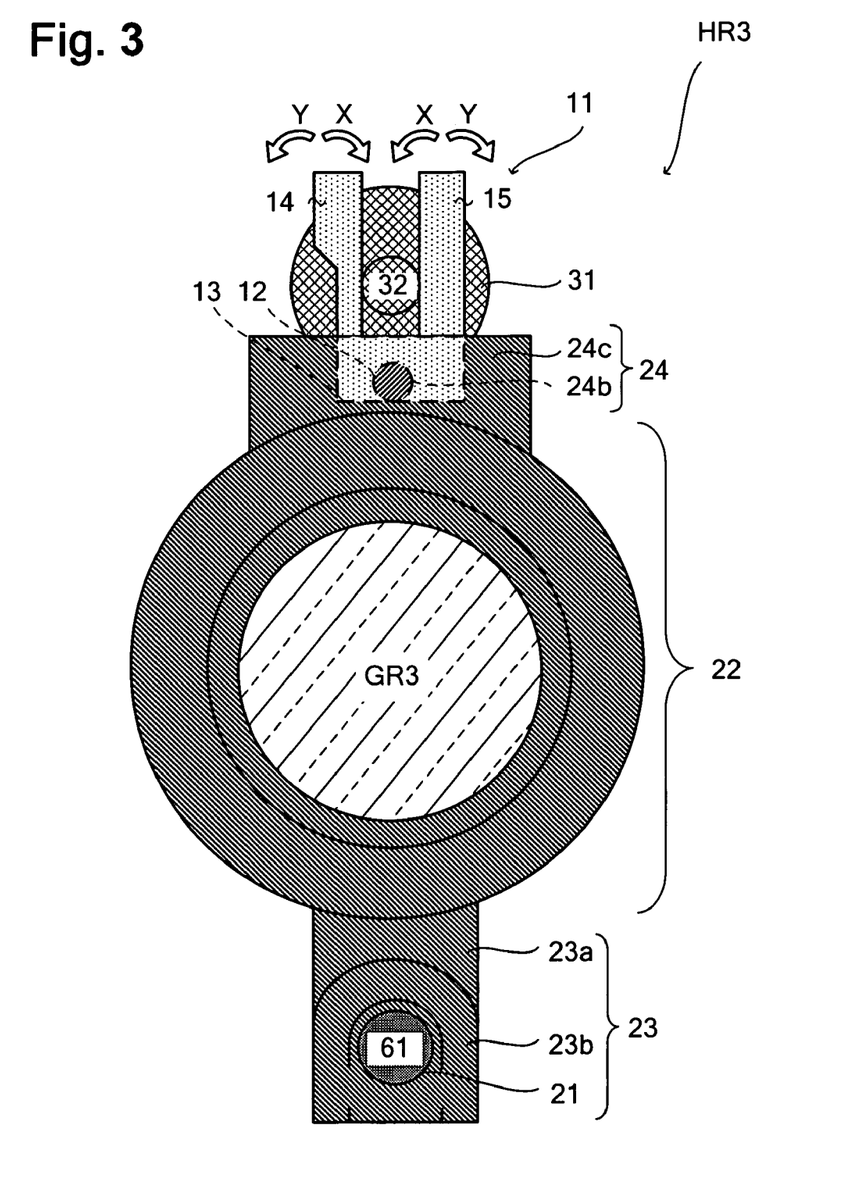
FIG. 3 is a front view showing a third lens unit holder and the like viewed from the object side toward the image side in the lens barrel in the extended condition.

Now, the third lens unit holder HR3 will be described in detail. FIG. 3 is a front view showing the third lens unit holder HR3 and the like. Specifically, a condition viewed from the object side toward the image side is shown (here, the third lens-unit holder HR3 when the lens barrel 79 is extended (FIG. 2) is shown).

As shown in this figure, the third lens unit holder HR3 has a lens holding portion 22, a guide shaft engagement portion 23 and a rack attachment portion 24.

The lens holding portion 22 holds the third lens unit GR3. While the configuration of the lens holding portion 22 is not specifically limited, an example thereof is a structure sandwiching the rim of the lens (the third lens unit GR3) as shown in FIGS. 1 to 3.

The guide shaft engagement portion 23 is a member having the guide hole 21, and is provided on a part of the lens holding portion 22 (for example, a lower part of the lens holding portion 22). The configuration of the lens holding portion 22 is not specifically limited, either. An example thereof is a structure having: an engagement support piece 23a provided so as to extend from a lower part of the lens holding portion 22 to the image sensor SR (image side); and guide hole forming pieces 23b protruding from the engagement support piece 23a and having the guide hole 21 (see FIG. 3) as shown in FIGS. 1 and 2.

The rack attachment portion 24 is a member for attaching the rack 11 sandwiching a revolving shaft 32 of the driving motor 31 so as to be rotatable, and is provided on a part of the lens holding portion 22 (for example, an upper part of the lens holding portion 22). The configuration of the rack attachment portion 24 is not specifically limited, either. An example thereof is a structure having: an attachment support piece 24a provided so as to extend from an upper part of the lens holding portion 22 toward the object side; and rack attachment shaft holding pieces 24c protruding from the attachment support piece 24a and holding a rack attachment shaft 24b (see FIG. 3) as shown in FIGS. 1 and 2.

The rack attachment shaft 24b has an axial direction in the same direction as the direction of the optical axis AX. The rack 11 has an insertion hole 12 in which the rack attachment shaft 24b can be inserted. Consequently, the rack attachment portion 24 rotatably attaches the rack 11 by inserting the rack attachment shaft 24b in the insertion hole 12 of the rack 11.

3. Details of the Rack and the Revolving Shaft of the Driving Motor

Now, details of the rack 11 and the revolving shaft (rotation shaft) 32 of the driving motor 31 will be described in detail.

3-1. Rack

The rack 11 has: a rack body 13 provided with the insertion hole 12; and a first sandwiching piece 14 and a second sandwiching piece 15 that rise from the rack body 13 as shown in FIG. 3. The first sandwiching piece 14 and the second sandwiching piece 15 sandwich the revolving shaft 32 of the driving motor 31.

Either one of the first sandwiching piece 14 and the second sandwiching piece 15 has elasticity. This is because, for example, when the first sandwiching piece 14 has elasticity, even when there is a clearance between the rack 11 and the revolving shaft 32, the flexible first sandwiching piece 14 and the second sandwiching piece 15 can easily sandwich the revolving shaft 32.

On the other hand, for example, the second sandwiching piece 15 has a comparatively high rigidity (non-elasticity). This is because it is preferable for the second sandwiching piece 15 to have a predetermined strength in order to provide a tooth portion (rack tooth portion, not shown) that engages with a tooth portion (screw tooth portion, not shown) of a lead screw of the revolving shaft 32 described later.

The lens barrel 79 of the present invention is provided with a member for changing the sandwiching force of the rack 11. One example of a member is the spear portion 1 provided on the second lens unit holder HR2, which is described later. While the material of the rack 11 is not specifically limited, the rack 11 is made of a resin such as polyacetal.

3-2. Revolving Shaft of the Driving Motor

The sandwiched revolving shaft 32 of the driving motor 31 has a lead screw or the like (not shown) for transmitting the driving force to the rack 11. For example, a tooth portion (screw tooth portion, not shown) of a helical lead screw is provided on the periphery (peripheral surface) of the revolving shaft 32.

By the screw tooth portion of the revolving shaft 32 engaging (for example, meshing) with the rack tooth portion of the rack 11, the driving force of the driving motor 31 is transmitted to the rack 11, and consequently, to the third lens unit holder HR3. As a result, the third lens unit holder HR3 can move backward and forward along the guide shaft 61.

4. The Extended Condition of the Lens Barrel and the Collapsed Condition of the Lens Barrel Now, the extended condition of the lens barrel and the collapsed condition of the lens barrel will be described with reference to FIGS. 1 to 3. For clarification of characteristics of the present invention, the revolving shaft 32 of the driving motor 31 and the rack 11 will be described preponderantly.

4-1. The Extended Condition (Photographing Possible Condition) of the Lens Barrel When zooming or the like is performed in a digital camera or the like, the first lens unit GR1 to the third lens unit GR3 move toward the object side or move toward the image side. When the first lens unit GR1 to the third lens unit GR3 move toward the object side (that is, when the lens barrel 79 is extended), as shown in FIG. 2, by the cam ring 44 rotating (rotation in the normal direction), the first lens unit GR1 and the second lens unit GR2 are moved out toward the object side in the direction of the optical axis AX (in the forward direction F). Moreover, by the driving motor 31 rotating (rotating in the normal direction), the third lens unit GR3 provided in the third lens unit holder HR3 is moved out toward the object side in the direction of the optical axis AX.

When the third lens unit holder HR3 moves like this, it is necessary to receive the driving force of the driving motor 31, which may be the revolving force of the revolving shaft or other rotation force in the normal direction (it is necessary that the revolving force be transmitted). For this reason, the rack tooth portion of the rack 11 in the third lens unit holder HR3 meshes (engages) with the screw tooth portion of the lead screw of the revolving shaft 32. Therefore, as shown in FIG. 3, the first sandwiching piece 14 and the second sandwiching piece 15 sandwich the revolving shaft 32.

4-2. The Collapsed Condition of the Lens Barrel

On the other hand, when the first lens unit GR1 to the third lens unit GR3 move toward the image side (that is, the lens barrel 79 is collapsed), by the cam ring 44 rotating in the reverse direction (rotation in the direction reverse to the normal direction of rotation for extending the lens barrel 79), the first lens unit GR1 and the second lens unit GR2 returns toward the image side in the direction of the optical axis AX (in the backward direction R). Moreover, by the driving motor 31 rotating in the reverse direction, the third lens unit GR3 also returns toward the image side in the direction of the optical axis AX.

When the lens barrel 79 is completely collapsed as shown in FIG. 1, it is unnecessary for the third lens unit holder HR3 to receive the driving force of the driving motor 31, which may be the revolving force of the revolving shaft 32 or other rotation force in the reverse direction. That is, it is unnecessary that the rack tooth portion of the rack 11 in the third lens unit holder HR3 mesh (engage) with the lead screw tooth portion of the revolving shaft 32. Conversely, when these (the rack tooth portion and the lead screw tooth portion) mesh together, there is a possibility that a shift (relative movement) occurs therebetween because of a shock or the like given to the digital camera and the tooth portions break.

For this reason, in the lens barrel 79 of the present invention, the engagement (mesh) between the rack tooth portion of the rack 11 and the lead screw tooth portion of the revolving shaft 32 is released.

5. Spear Portion

Accordingly, in the lens barrel 79 of the present invention, by separating the first sandwiching piece 14 and the second sandwiching piece 15 constituting the rack 11 from each other, the sandwiching of the revolving shaft 32 by the sandwiching pieces 14 and 15 is released, thereby canceling the engagement between the rack tooth portion and the lead screw tooth portion. A member (spear portion 1) for performing such separation of the sandwiching pieces 14 and 15 is provided on the second lens unit holder HR2. Hereinafter, the function and the like of the spear portion 1 will be described with reference to FIG. 4 (a front view of the third lens unit holder HR3 in the lens barrel 79 in the collapsed condition) and FIG. 1.

Figure 4:
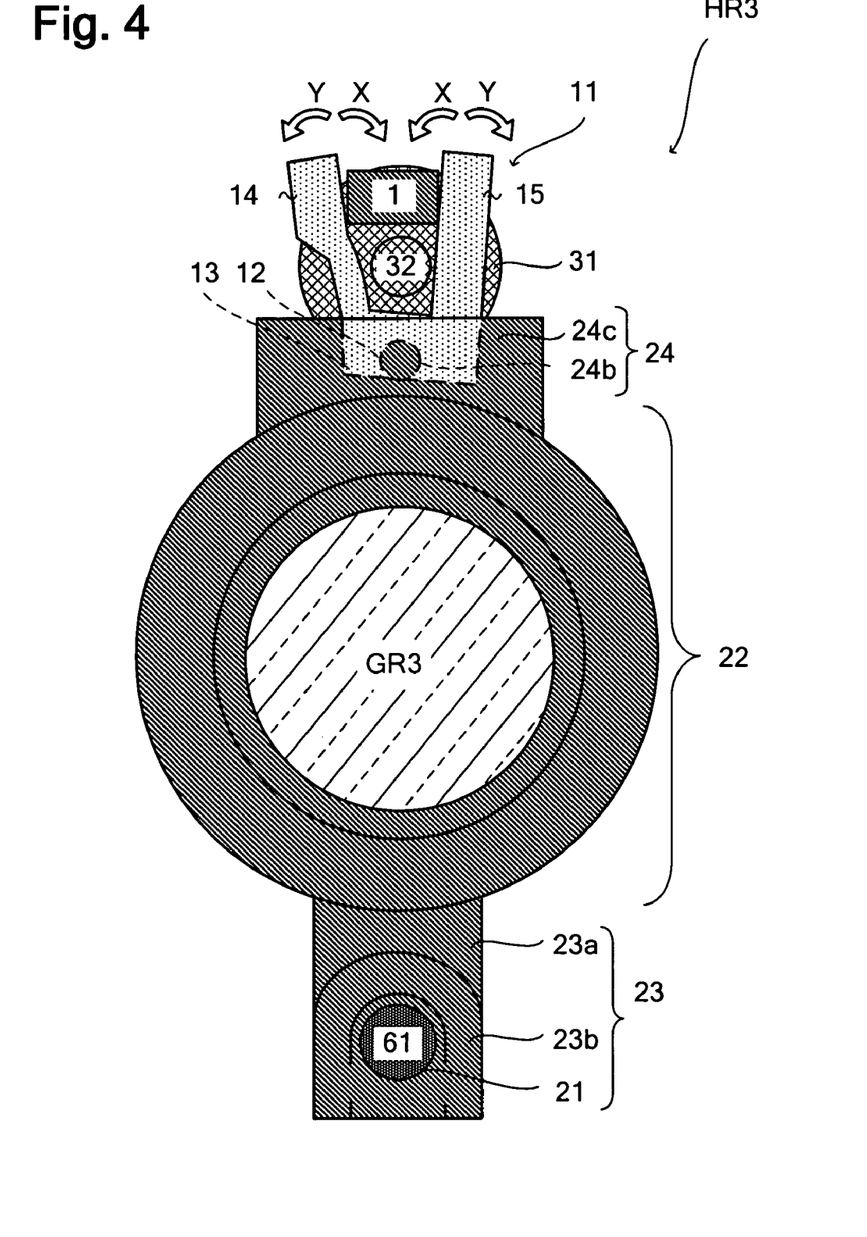
FIG. 4 is a front view showing a third lens unit holder and the like viewed from the object side toward the image side in the lens barrel in the collapsed condition.

As shown in FIG. 4, the spear portion (contact portion) 1 has a size (width) larger than the interval (sandwiching interval) between the sandwiching pieces 14 and 15 of the rack 11 at least in a part of the spear body. When the lens barrel 79 is collapsed, the spear portion 1 is inserted in the interval between the sandwiching pieces 14 and 15 of the rack 11 in the vicinity of the upper ends (in the vicinity of the free ends) of the sandwiching pieces 14 and 15. In addition, in the case of such insertion, the spear portion 1 is situated above the revolving shaft 32 being sandwiched (that is, the positional relationship is such that the rack body 13 and the spear portion 1 sandwich the revolving shaft 32).

When such a positional relationship of the spear portion 1 is maintained, the interval between the sandwiching pieces 14 and 15 of the rack 11 is increased by the spear portion 1 (that is, the sandwiching force of the sandwiching pieces 14 and 15 is decreased). Consequently, the engagement between the rack tooth portion carved on the second sandwiching piece 15 and the screw tooth portion of the revolving shaft 32 is released.

By the spear portion 1 being inserted between the sandwiching pieces 14 and 15 like this, even if the rack 11 is deformed (displaced), unnecessary vibrations (movements) never occur on the third lens unit holder HR3. This is because, since the rack 11 is attached to the third lens unit holder HR3 through the rack attachment shaft 24b, only the rack 11 is deformed while rotating about the rack attachment shaft 24b and the force (vibrations or the like) due to the deformation and the like is not transmitted to the third lens unit holder HR3.

Moreover, in order that the separation relationship between the revolving shaft 32 and the sandwiching pieces 14 and 15 is maintained by the contact by the spear portion 1 being inserted between the sandwiching pieces 14 and 15, it is necessary that the contact relationship between the spear portion 1 and the sandwiching pieces 14 and 15 be maintained.

Accordingly, in the lens barrel 79 of the present invention, although the spear portion 1 is inserted between the sandwiching interval between the sandwiching pieces 14 and 15, an excessive regressive movement (a movement that separates the spear portion 1 and the sandwiching pieces 14 and 15 from each other) of the rack 11 (and consequently, the third lens unit holder HR3) cannot occur. Specifically, as shown in a part α of FIG. 1, before the third lens unit holder HR3 makes an excessive regressive movement, the third lens unit holder HR3 collides with the surface of the stationary barrel 41 where the image sensor SR is disposed.

The rack 11 may be prevented from making an excessive advance movement under a condition where the spear portion 1 is inserted in the sandwiching interval between the sandwiching pieces 14 and 15. For example, the third lens unit holder HR3 may collide with a part of the second lens unit holder HR2 before the third lens unit holder HR3 makes an excessive advance movement as shown in a part β of FIG. 1.

6. Various Characteristics of the Present Invention

As described above, the present invention is the lens barrel 79 that has an image capturing optical system comprising a plurality of lens units (GR1 to GR3) and is collapsible. The lens barrel 79 is provided with: the driving motor 31; the rack 11 that receives the transmission of the driving force by engaging with the revolving shaft 32 which is a part of the driving motor 31; and the third lens unit holder HR3 holding the third lens unit GR3.

In particular, by a displacement (position change; fluctuation) of the rack 11, the engagement between the rack 11 and the revolving shaft 32 is released. Specifically, the revolving shaft 32 and the rack 11 (for example, the second sandwiching piece 15 having the rack tooth portion) in contact with each other for engagement are separated from each other by the spear portion 1 being in contact with the rack 11 (sandwiching pieces 14 and 15).

Normally, in the lens barrel 79 like the present invention, the lens units (GR1 to GR3) included in the image capturing optical system are moved for zooming (magnification varying), focusing (achieving in-focus state) and the like. Accordingly, for example, in order to move the third lens unit GR3, the lens barrel 79 of the present invention is provided with: the third lens unit holder HR3 holding the third lens unit GR3; and the driving motor 31 that supplies the motive force (driving force) for moving the third lens unit holder HR3.

In particular, the rack 11 for transmitting the driving force of the driving motor 31 to the third lens unit holder HR3 is attached to the third lens unit holder HR3. The rack 11 engages (meshes) with the revolving shaft 32.

Although no problem arises when such an engagement relationship between the rack 11 and the revolving shaft 32 always holds, when the engagement relationship does not hold because of a shock or the like given to the lens barrel 79, a relative movement can occur between the rack 11 and the revolving shaft 32. Then, the teeth (the screw tooth portion and the rack tooth portion) provided on the rack 11 and the revolving shaft 32 break. Accordingly, in the present invention, the engagement relationship between the rack 11 and the revolving shaft 32 is previously canceled before a shock or the like is given to the lens barrel 79. Specifically, the above-described spear portion 1 releases the engagement between the rack 1 and the revolving shaft 32.

When the spear portion 1 previously separates the rack 11 and the revolving shaft 32 from each other to release the engagement as described above (for example, when the lens barrel 79 is in the collapsed condition), even when a shock is given to the lens barrel 79 to cause a relative movement between the rack 11 and the revolving shaft 32, these (the rack 11 and the revolving shaft 32) cannot break. This is because the rack 11 and the revolving shaft 32 are out of contact with each other. Then, according to the present invention, only by providing such a simple member as the spear portion 1, a lens barrel 79 can be obtained that is capable of reliably and easily preventing the breakage of the screw tooth portion (the tooth of the revolving shaft 32) and the rack tooth portion (the tooth of the rack 11).

As described above, in the lens barrel 79, it is necessary to move the lens units (GR1 to GR3) for zooming and the like. For this reason, when the engagement relationship between the rack 11 and the revolving shaft 32 holds, it is preferable that the engagement force between these (the rack 11 and the revolving shaft 32) be high.

Therefore, the rack 11 may be provided with the first sandwiching piece 14 and the second sandwiching piece 15 that increase the engagement (engagement force) between the rack tooth portion and the screw tooth portion. For example, these sandwiching pieces 14 and 15 deliver a pushing force in a direction that brings the rack tooth portion and the screw tooth portion into close contact with each other (direction that presses the screw tooth portion against the rack tooth portion; referred to as positive direction X) (see FIGS. 3 and 4).

Moreover, when such sandwiching pieces 14 and 15 are provided, these are deformed by being brought into contact with the spear portion 1. Accordingly, in the lens barrel 79 of the present invention, the pushing (pushing force) is reduced by the deformation of the sandwiching pieces 14 and 15 based on the contact between the spear portion 1 and the sandwiching pieces 14 and 15. Specifically, the pushing force is reduced by deforming the sandwiching pieces 14 and 15 in a direction to weaken the contact between the rack 11 and the revolving shaft 32 (direction opposite to the above-mentioned positive direction X; referred to as opposite direction Y) by bringing the spear portion 1 into the sandwiching pieces 14 and 15.

As described above, when the pushing force of the sandwiching pieces 14 and 15 is weaken, the revolving shaft 32 engaged with the rack 11 is easily separated. That is, by the spear portion 1 deforming the sandwiching pieces 14 and 15, the rack 11 is displaced to thereby separate the rack 11 from the revolving shaft 32.

As described above, the rack 11 having a sandwiching structure that sandwiches the revolving shaft 32 sandwiches the revolving shaft 32 to thereby easily bring the rack tooth portion and the screw tooth portion into contact with each other and establish the engagement relationship between these (the rack 11 and the revolving shaft 32). On the other hand, by the spear portion 1 entering the sandwiching interval between the sandwiching pieces 14 and 15 (by the contact accompanying the entry), the sandwiching pieces 14 and 15 are deformed in the opposite direction Y and the pushing force can be easily deformed.

Then, the lens barrel 79 of the present invention can bring the release of the engagement relationship between the revolving shaft 32 and the rack 11 (the separation relationship between the rack 11 and the revolving shaft 32) as the pushing force is reduced. Therefore, with such a structure, the present invention is a lens barrel 79 capable of more reliably and easily preventing the breakage of the rack tooth portion and the screw tooth portion.

Moreover, in the lens barrel 79 of the present invention, the spear portion 1 may be provided on the second lens unit holder HR2 (for example, the second lens unit holder HR2 and the spear portion 1 may be integrally formed). This is because, with such a structure, it is unnecessary to provide a separate driving source for moving only the spear portion 1 in the lens barrel 79 and simplification, size reduction and the like can be achieved in the structure of the lens barrel 79.

It is frequently when the lens barrel is in the collapsed condition that the breakage or the like of the rack tooth portion and the screw tooth portion can occur due to a shock or the like. In a case where the spear portion 1 is provided on the second lens unit holder HR2 as described above, when the lens barrel 79 is collapsed (that is, when the second lens unit holder HR2 moves so as to approach the first lens unit holder HR1), the spear portion 1 inevitably enters the sandwiching interval between the sandwiching pieces 14 and 15 of the rack 11. Therefore, the present invention can be said to be a lens barrel 79 capable of effectively preventing the breakage of the screw tooth portion and the rack tooth portion in the collapsed condition.

Moreover, the rack 11 of the lens barrel 79 of the present invention has an attachment structure (vibration avoidance structure) in which when the rack 11 is in contact with the spear portion 1, the vibrations and the like due to the contact are not transmitted to the third lens unit holder HR3. For example, the structure is such that the rack 11 rotates about the attachment position of the third lens unit holder HR3 also by a force accompanying the deformation of the sandwiching pieces 14 and 15.

An example of this structure is a structure in which the rack attachment shaft 24b is inserted in the rack body 13 provided with the insertion hole 12 to thereby attach the rack 11 to the third lens unit holder HR3. With such a structure, even if vibrations occur due to a deformation or the like of the rack 11, the rack 11 itself rotates about the rack attachment shaft 24b, so that the vibrations or the like are not transmitted to the third lens unit holder HR3. Therefore, in the lens barrel 79 of the present invention, the third lens unit holder HR3 does not vibrate even when the engagement between the rack 11 and the revolving shaft 32 by the spear portion 1 is released.

Other Embodiments

The present invention is not limited to the above-described embodiment, and may be modified in various ways without departing from the spirit of the present invention.

For example, the configuration of the spear portion 1 is not specifically limited. In summary, it is necessary only that the sandwiching pieces 14 and 15 (in particular, the second sandwiching piece 15 having the rack tooth portion) be deformed in the opposite direction Y (see FIG. 4, etc.). For this reason, for example, the end (for example, the front end) of the spear portion 1 that enters the sandwiching interval between the sandwiching pieces 14 and 15 first may be tapered. This is because, with such a structure, the spear portion 1 is easily and reliably inserted in the sandwiching interval between the sandwiching pieces 14 and 15.

Figure 5:
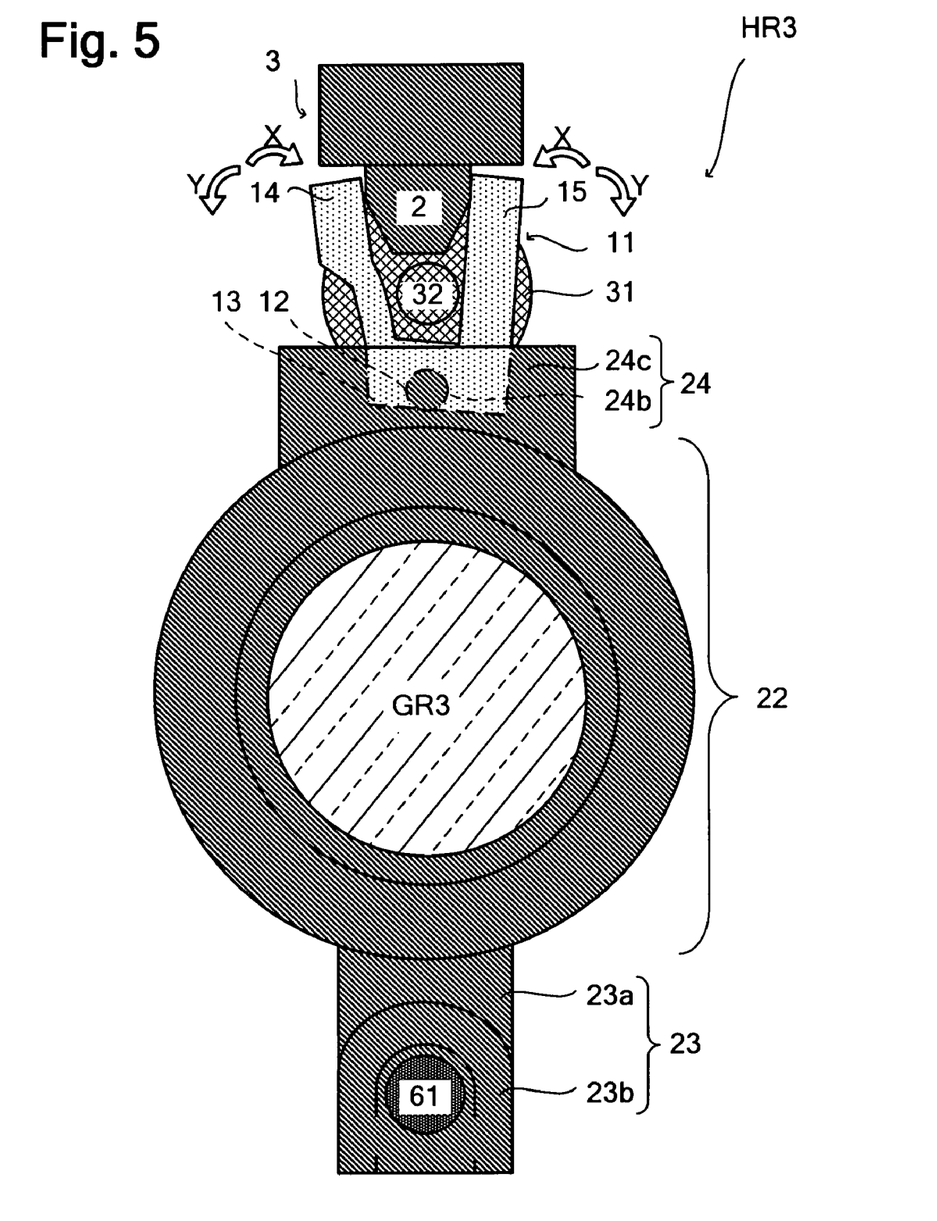
FIG. 5 is a front view of the third lens unit holder and the like showing another example of FIG. 4.

Moreover, in the description given above, the spear portion 1 that makes movements such as an entry and a retreat (movements in the F direction and the R direction) is provided on the second lens unit holder HR2 rendered movable by the rotation of the cam ring 44 or the like. However, the present invention is not limited thereto. For example, a solenoid 3 where a movable core 2 functions as the spear portion may be provided as shown in FIG. 5.

In the case of such a structure, although a separate driving source (solenoid 3) that moves the movable core 2 serving as the spear portion is necessary, various operation patterns of the spear portion (that is, the movable core 2) are realized. For example, a lens barrel 79 is obtained in which the engagement between the rack 11 and the revolving shaft 32 can be temporarily released when there is a possibility of breakage even in the extended condition. The end of the movable core 2 serving as the spear portion may be tapered as mentioned above also when such a solenoid 3 is used.

Figure 6:
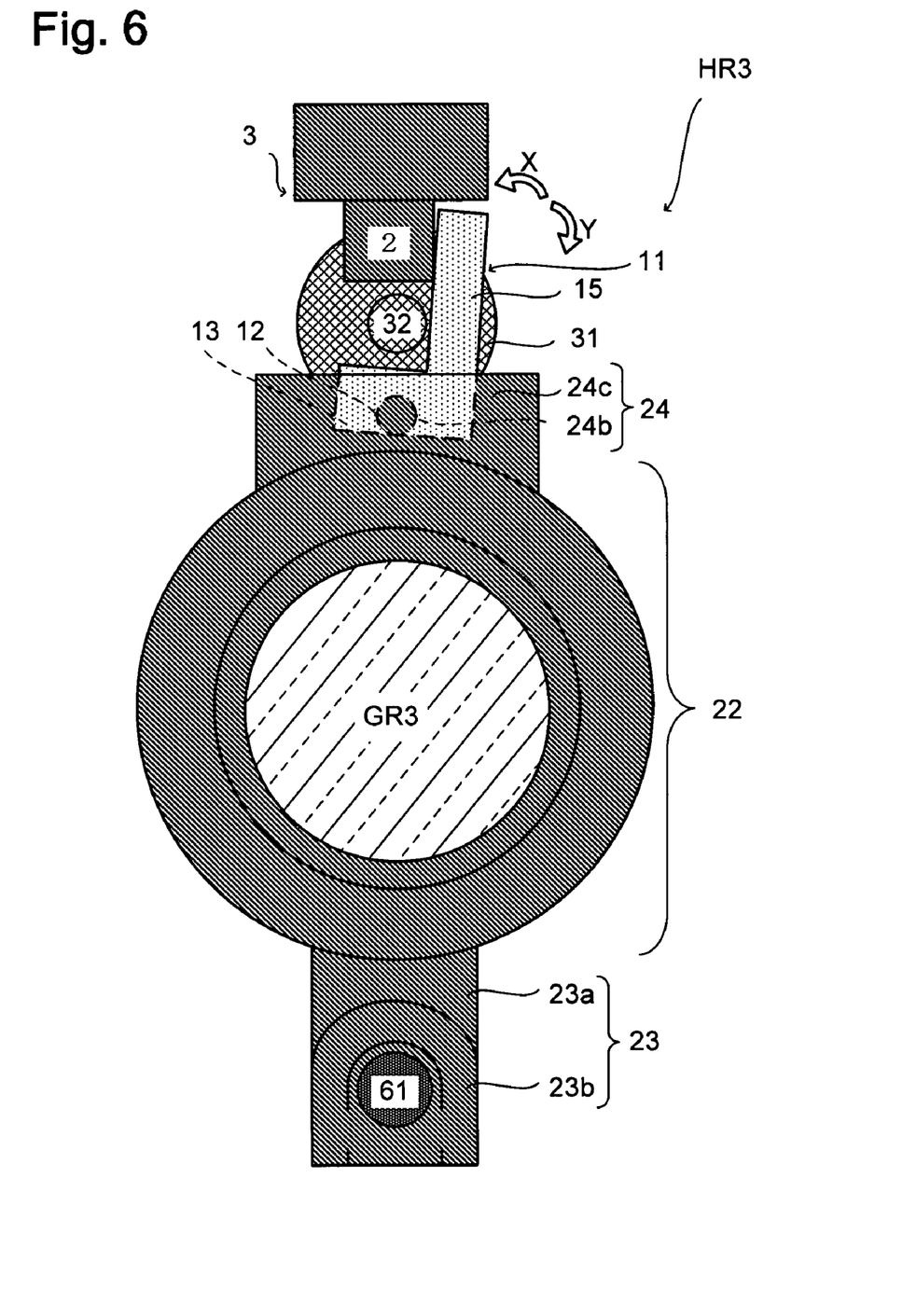
FIG. 6 is a front view of the third lens unit holder and the like showing another example of FIGS. 4 and 5.

While the above description is given by using the rack 11 having the two sandwiching pieces 14 and 15, the present invention is not limited thereto. For example, a rack 11 may be used that has only the second sandwiching piece 15 having a rack tooth portion as shown in FIG. 6 (rack 11 having a single sandwiching piece). That is, when a the rack tooth portion is carved on the second sandwiching piece 15, the rack 11 may be separated from the revolving shaft 32 by deforming only the second sandwiching piece 15. In the case of such a rack 11, the second sandwiching piece 15 has a strength enough to cause a slight bend although having a strength (rigidity) that can endure the carving of the rack tooth portion.

As described above, it is necessary for the lens barrel 79 of the present invention only to have a structure separating the tooth portion (tooth) of the rack 11 from the tooth portion (tooth) of the revolving shaft 32 by the rack 11 being displaced (deformed or fluctuated). Therefore, the present invention is not limited to the structure using the spear portion 1, and a structure may be used in which the tooth portion of the rack 11 is separated from the tooth portion of the revolving shaft 32 by the rack 11 itself being displaced when collapsed or the like.

Moreover, the spear portion 1 is not limited to the above-described sandwiching structure (sandwiching configuration), either. That is, it is necessary for the spear portion 1 only to separate the rack tooth portion from the screw tooth portion by coming into contact with the rack 11. Thus, the configuration and the movement method of the spear portion 1 and the configuration and the like of the rack 11 are not specifically limited.

In summary, the structure of the present invention and effects produced thereby are as follows:

The present invention is a lens barrel that is provided with an image capturing optical system comprising a plurality of lens units and is extensible and collapsible. The lens barrel is provided with the first driving source (for example, the driving motor) and the transmission portion (for example, the rack) that engages with a part of the first driving source to thereby receive the transmission of a motive force, and has the first lens unit holding frame (lens frame) that holds at least one of the lens units. In particular, the engagement between the transmission portion and the part of the first driving source is released by a displacement of the transmission portion.

With this, the engagement relationship between the transmission portion and the driving source is established when the lens frame is moved, and the breakage of the transmission portion or the driving source can be reliably and easily prevented when the lens frame is not moved.

For example, a contact portion that comes into contact with the transmission portion to thereby displace the transmission portion is provided in the lens barrel. This is because, with this structure, the part of the first driving source and the transmission portion in contact with each other for engagement can be separated from each other by the contact portion coming into contact with the transmission portion.

The part of the first driving source is the revolving shaft, and the revolving shaft and the transmission portion are provided with teeth engaged with each other. This is because, with this structure, a strong engagement relationship is established.

Normally, in the lens barrel like the present invention, the lens units included in the image capturing optical system are moved for zooming (magnification varying) and the like. For this reason, to the first lens unit holding frame, the motive force of the first driving source (for example, the revolving force of the revolving shaft) is transmitted through the transmission portion. By use of this transmitted force, the first lens unit holding frame moves backward and forward.

In the lens barrel of the present invention, in order to prevent the breakage of the teeth provided on the transmission portion and the revolving shaft, the engagement relationship between the transmission portion and the revolving shaft is previously released before a shock or the like is given to the lens barrel. Specifically, the engagement between the transmission portion and the revolving shaft is released by the above-described contact portion.

As described above, when the engagement is released by the contact portion previously separating the transmission portion and the revolving shaft from each other, since these (the transmission portion and the revolving shaft) are out of contact, breakage cannot occur. Thus, according to the present invention, a lens barrel is obtained in which the breakage of the tooth of the revolving shaft and the tooth of the transmission portion can reliably and easily prevented only by providing such a simple member as the contact portion.

The transmission portion may be provided with the pushing piece that engages the teeth of the transmission portion and the teeth of the revolving shaft with each other. For example, a pushing piece may be provided that delivers a pushing force in a direction that brings the transmission portion and the revolving shaft in close contact with each other (positive direction).

In addition, when such a pushing piece is provided, the pushing pieces (and consequently, the transmission portion) can be deformed by bringing the contact portion into contact with the pushing piece. Therefore, in the lens barrel of the present invention, the transmission portion is displaced by causing a deformation of the pushing piece by the contact between the contact portion and the pushing piece. That is, in the lens barrel of the present invention, the pushing (pushing force) is reduced by the deformation of the pushing piece based on the contact between the contact portion and the pushing piece, and this leads to the release of the engagement relationship between the revolving shaft and the transmission portion.

An example of the structure (configuration) of such a pushing piece is a sandwiching structure that sandwiches the revolving shaft. With this structure, the engagement relationship between these (the transmission portion and the revolving shaft) can be established by sandwiching the revolving shaft, and the pushing force can be easily reduced by deforming the pushing piece by the contact portion entering the sandwiching interval by the pushing piece (by the contact accompanying the entry).

The end (for example, the front end) of the contact portion that enters the sandwiching interval by the pushing piece first may be tapered. This is because, with this structure, the contact portion is easily and reliably inserted in the sandwiching interval by the pushing piece.

The contact portion makes a movement such as an entry for the contact with the transmission portion (pushing piece) as described above. As the motive force of the movement, the second lens unit holding frame (for example, the lens holding frame adjoining the first lens unit holding frame) that holds another lens unit of the image capturing optical system and is movable may be used. That is, the contact portion may be provided on the second lens unit holding frame.

Moreover, the condition of the lens barrel in which a breakage occurs on the teeth of the revolving portion and the transmission portion due to a shock or the like is frequently the collapsed condition. Therefore, in the lens barrel of the present invention, when the lens barrel is collapsed, that is, when the second lens unit holding frame moves so as to approach the first lens unit holding frame, the contact portion releases the engagement between the part of the first driving source and the transmission portion by use of the movement. With this structure, the breakage of the teeth of the revolving shaft and the transmission portion can be effectively suppressed.

A second driving source (power source) may be provided that provides a motive force for moving the second lens unit holding frame provided in the contact portion. Moreover, the second lens unit holding frame may be made manually movable.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A lens barrel, comprising:
an optical system, the optical system including:
a first lens unit;
a second lens unit;
a first lens unit holding frame for holding the first lens unit;
a first driving source for supplying a motive force;
a transmission portion that engages with a part of the first driving source to thereby receive a transmission of the motive force and transmits the received motive force to the first lens frame;
a second lens unit holding frame that is movable and holds the second lens unit; and
a contact portion that is provided on the second lens holding frame and comes into contact with the transmission portion to displace the transmission portion, wherein the engagement between the transmission portion and the part of the first driving source is released by the displacement of the transmission portion.

2. The lens barrel according to claim 1, wherein the part of the first driving source is a revolving shaft, and the revolving shaft and the transmission portion are provided with teeth engaged with each other.

3. The lens barrel according to claim 2, wherein the transmission portion is provided with a pushing piece that increases the engagement between the tooth of the transmission portion and the tooth of the revolving shaft.

4. The lens barrel according to claim 3, wherein the contact portion comes into contact with the transmission portion by the pushing piece, and the transmission portion is displaced as the pushing piece is deformed by the contact between the contact portion and the pushing piece.

5. The lens barrel according to claim 3, wherein the pushing piece and the teeth in the transmission portion constitute a sandwiching structure that sandwiches the revolving shaft.

6. The lens barrel according to claim 5, wherein the contact portion enters a sandwiching interval of the sandwiching structure to thereby come into contact with the pushing piece.

7. The lens barrel according to claim 6, wherein an end of the contact portion that enters the sandwiching interval of the sandwiching structure is tapered.

8. The lens barrel according to claim 1, wherein the second lens unit holding frame moves so as to approach the first lens unit holding frame to thereby bring the contact portion into contact with the transmission portion.

9. The lens barrel according to claim 1, further comprising:
a second driving source for supplying a motive force to move the second lens unit holding frame.

10. A lens barrel, comprising:
a first lens holding frame;
a driving source for driving the first lens holding frame in a direction of an optical axis;
a driving force transmitting portion for transmitting a driving force from the driving source to the first lens holding frame, the driving force transmitting portion having a gear intermeshing portion for transmitting the driving force;
a second lens holding frame that is movable in the direction of the optical axis; and
a releasing portion that is driven integrally with the second lens holding frame, wherein the releasing portion releases the gear intermeshing at the gear intermeshing portion according to the position of the second lens holding frame in the lens optical axis direction.

11. The lens barrel according to claim 10, wherein the driving force transmitting portion includes:
a shaft portion that transmits the driving force of the driving source; and
a meshing portion that operates in concert with the first lens holding frame and meshes with the shaft portion.

12. The lens barrel according to claim 11, further comprising:
a pushing portion for pushing the meshing portion against the shaft portion, wherein the releasing portion releases the pushing of the pushing portion against the shaft portion.

13. The lens barrel according to claim 12, wherein the shaft portion comprises a lead screw portion, and the meshing portion comprises a rack gear portion.

14. The lens barrel according to claim 13, wherein the rack gear portion is pushed by the pushing portion to intermesh with the lead screw portion, and the releasing portion comprises an insertion member to be inserted so as to release the intermeshing of the rack gear portion with the lead screw portion.

15. The lens barrel according to claim 14, wherein the insertion member has a tapered surface in the direction of the length.

16. The lens barrel according to claim 15, wherein the releasing portion releases the gear intermeshing when the lens barrel is collapsed.

17. The lens barrel according to claim 10, further comprising:
a driving source for driving the second lens holding frame.

18. A lens barrel, comprising:
an optical system including a plurality of lens units;
a first driving source for supplying a motive force, the first driving source being provided with a rotation shaft having first teeth;
a transmission portion, the transmission portion including:
second teeth for intermeshing with the first teeth to receive the motive force, the transmission portion transmitting the motive force received by the second teeth to one of the plurality of lens units;
a pushing piece that increases the intermeshing between the first teeth and the second teeth; and
a contact portion movable in a direction of an optical axis for deforming the pushing piece by contacting the pushing piece,
wherein the intermeshing between the first teeth and the second teeth is released by the deformation of the pushing piece when the contact portion moves in the direction of the optical axis and contacts the pushing piece.

* * * * *